United States Patent Office 3,477,961
Patented Nov. 11, 1969

3,477,961
POLY-ALPHA-OLEFIN IRON-NICKEL ALLOY MIXTURES
Eugene G. Castagna, Clark, N.J., assignors to Chevron Research Company, San Francisco, Calif., a corporation of Delaware
No Drawing. Filed Mar. 9, 1966, Ser. No. 532,833
Int. Cl. H01f 1/26, 1/00
U.S. Cl. 252—62.54          2 Claims

ABSTRACT OF THE DISCLOSURE

An intimate mixture of crystalline poly-α-olefins and nickel-iron alloy particles are useful for magnetic induction bonding of thermally fusible poly-α-olefin articles to each other.

---

This invention relates to compositions comprising high molecular weight poly-α-olefins and iron-nickel alloys. More particularly, it is directed to intimate mixtures of crystalline poly-α-olefins and nickel-iron alloys which are useful for magnetic induction bonding.

In general, thermoplastics have no magnetic susceptibility. However, various magnetic materials have been mixed with them to produce compositions having magnetic susceptibility. When placed in a magnetic field these compositions may be heated by induction—with the object being to maintain temperatures useful for softening and melting surrounding thermoplastic materials. Ferromagnetic materials, such as iron filings and iron-cobalt alloys, are suggested by the art for this use. However, the Curie points are not sufficiently controllable in the prior art ferrous materials to permit them to be used with thermoplastic materials which decompose or are otherwise deleteriously affected by the high temperatures produced in the prior art materials. Certain nonferrous magnetic materials with controllable Curie points have been suggested. But they are considerably less permeable than the ferrous material and require more severe magnetic field conditions.

It has now been found that mixtures of high molecular weight poly-α-olefins and certain nickel-iron alloys have a controlled magnetic susceptibility so that they may be heated by induction to the specific temperature range which is useful for fusion bonding poly-α-olefin articles without decomposing the articles. Further, since the iron-nickel alloys of these mixtures have excellent permeability the severe field conditions necessary with nonferrous alloys having controllable Curie points are not required.

In more specific terms these unique mixtures comprise about 20 to 90, preferably about 30 to 60, weight percent poly-α-olefin and about 10 to 80, preferably about 40 to 70, weight percent nickel-iron alloy having a Curie point between about 125 and 300° C. The weight ratio of nickel to iron in such alloys is about 30:70 to 38:62.

The poly-α-olefins of this invention are substantially crystalline solids which are extrudable or moldable into solid formed shapes. The monomer units of these polymers contain 2 to about 8 carbon atoms, preferably 2 to 6 carbon atoms. Examples of such polymers are polypropylene, high density polyethylene, poly-3-methyl-1-butene, poly-4-methyl-1-pentene, polystyrene and the like. Polypropylene is particularly preferred. The molecular weight of these polymers will usually be at least about 20,000.

The nickel-iron alloy may be homogeneously dispersed in the poly-α-olefin by known means. For this purpose the alloy will desirably be in the form of finely divided particles or powder. It is also desirable to have the poly-olefin in divided form such as granules or powder. Conventional blenders such as powder or melt blenders may be used to give homogeneous mixtures.

These novel polyolefin-alloy compositions may be used to bond poly-α-olefin articles which are thermally fusible to each other. The polyolefin which is mixed with the alloy will be compatible with and fusible to the articles being bonded. Desirably the polymer associated with the alloy is the same as that of the articles which are being bonded together. The Curie point of the alloy will be at least the melt temperature of the polyolefin involved and not more than its decomposition temperature. If different polyolefins are used, the maximum Curie point will roughly correspond to the lowest decomposition temperature and the minimum Curie point will approximate the lowest melt temperature.

Under normal conditions the alloy-polyolefin mixture will be applied as a thin film at the interface of the bonding surfaces of an article. These surfaces are then placed together and the article is appropriately coupled to a means for generating a high-frequency electromagnetic field. A sufficient field is generated to cause the dispersed alloy to heat the surrounding polymer to the desired melt temperature. After melt has been accomplished, the field is terminated and the surfaces of the article are held together until the polymer has again solidified.

The following examples illustrate the unique polyolefin-nickel/iron alloy compositions of this invention and their use. Unless otherwise specified all ratios and percentages are by weight.

Example I

A homogeneous mixture containing 3 lb. of 100 mesh 36/64 Ni/Fe alloy powder and 3 lb. polypropylene powder (about 95% isotactic, intrinsic viscosity 2.5 dl./g. in Decalin at 135° C., melt flow rate 2.5–4.0) was extruded as a filament having about a 50 mil diameter. This filament was placed in a thin slot in a block of polypropylene (~95% isotactic, intrinsic viscosity 2.5 dl./g. in Decalin at 135° C., melt flow rate 2.5–4.0). A sheet of polypropylene (~95% isotactic, intrinsic viscosity 2.5 dl./g. in Decalin at 135° C., melt flow rate 2.5–4.0) was fixed into the slot over the filament. The complete piece was coupled to a 77 mc., 10 kw. magnetic induction unit. At half-power (5 kw.) a smooth strong bond was achieved in 25–30 seconds.

Example II

The method of Example I was carried out using a filament made from a homogeneous mixture comprising 2 lb. 100 mesh 36/64 Ni/Fe alloy and 1 lb. polypropylene powder (~95% isotactic, intrinsic viscosity 2.5 dl./g. in Decalin at 135° C. melt flow rate 2.5–4.0). At 77 mc. and 5 kw. a smooth strong bond was achieved in 10–15 seconds.

In addition to the poly-α-olefin and alloy the compositions of this invention may also contain antioxidants, U.V. stabilizers, dye acceptors, dyes, fillers and the like.

I claim:
1. Composition comprising about 30–60 wt. percent substantially crystalline poly-α-olefin having a molecular weight of at least about 20,000 whose monomeric units contain 2 to about 6 carbon atoms intimately admixed with about 40–70 wt. percent nickel-iron alloy having a Curie point between about 125° C. and 300° C.
2. The composition of claim 1 wherein the poly-α-olefin is polypropylene.

References Cited

UNITED STATES PATENTS 2,393,541   1/1946   Kohler _____ 264—25

OTHER REFERENCES

Brailsford: Magnetic matreials, 1960, p. 113.
Kresser: Polypropylene, 1960, p. 59.

HELEN M. McCARTHY, Primary Examiner
R. D. EDMONDS, Assistant Examiner

U.S. Cl. X.R.

219—10.41, 10.53; 252—62.55; 260—41; 264—25